(12) United States Patent  
Doric

(10) Patent No.: US 9,046,659 B2  
(45) Date of Patent: Jun. 2, 2015

(54) INDEPENDENT DUAL PATH OPTICAL ROTARY JOINT

(71) Applicant: Optomak, Inc., Quebec (CA)

(72) Inventor: Sead Doric, L'Ancienne-Lorette (CA)

(73) Assignee: OPTOMAK, INC. (CA)

( * ) Notice: Subject to any disclaimer, the term of this patent is extended or adjusted under 35 U.S.C. 154(b) by 22 days.

(21) Appl. No.: 14/150,141

(22) Filed: Jan. 8, 2014

(65) Prior Publication Data

US 2014/0226932 A1 Aug. 14, 2014

Related U.S. Application Data

(60) Provisional application No. 61/763,596, filed on Feb. 12, 2013.

(51) Int. Cl.  
*G02B 6/36* (2006.01)

(52) U.S. Cl.  
CPC .......... *G02B 6/3604* (2013.01); *Y10T 29/49826* (2015.01)

(58) Field of Classification Search  
CPC ..................................................... G03B 6/3604  
See application file for complete search history.

(56) References Cited

U.S. PATENT DOCUMENTS

| 4,725,116 A | 2/1988 | Spencer et al. |
| 2007/0217736 A1 | 9/2007 | Zhang et al. |
| 2008/0118204 A1* | 5/2008 | Ankerhold ...................... 385/51 |
| 2009/0310911 A1* | 12/2009 | Zhang et al. .................... 385/26 |

* cited by examiner

*Primary Examiner* — Jerry Rahill  
(74) *Attorney, Agent, or Firm* — Mitch Harris, Atty at Law, LLC; Andrew M. Harris

(57) ABSTRACT

A dual optical path rotary joint provides a low friction coupling of optical fiber connections for optogenetic research and other applications. Two optical paths are provided through the rotary joint which are rotation-insensitive. The ends of the rotary joint rotate with respect to a common housing, which may be provided with ball-bearings or other suitable low-friction rotational mounts in which a first rotating component and a second rotating component are secured. The first and second rotating components are not mechanically linked in rotation, and their rotation is only synchronized by magnets disposed on the first rotating component and the second rotating component. A pair of optical fibers is coupled to the first rotating component and another pair of optical fiber is coupled to the second rotating component. A pair of isolated optical paths links the pairs of fibers, which are directed between the first and second rotating components by reflection.

20 Claims, 10 Drawing Sheets

INDEPENDENT DUAL PATH OPTICAL ROTARY JOINT

This U.S. Patent Application claims priority under 35 U.S.C. 119(e) to U.S. Provisional Patent Application Ser. No. 61/763,596, filed on Feb. 12, 2013.

BACKGROUND OF THE INVENTION

The present invention relates to the field of optical devices, and more particularly concerns a dual optical path rotary joint suitable for optogenetics applications and the like.

1. Field of the Invention

Fiber-optic rotary joints (FORJs) are well-known optical devices. FORJs allow uninterrupted transmission of an optical signal across a rotating interface created between two optical fibers as one is rotating about its axis and the other is stationary. Various types of FORJs exist including single path and multipath (e.g., dual path) FORJs. Single path ORJs have a single input and a single output port, and may be realized using two coaxially and oppositely aligned optical fibers terminated with lenses, such that the two fiber-to-lens assemblies are rotatable relative to each other, for example by using an appropriate bearing configuration.

In contrast, multipath FORJs have multiple input and/or output ports and multiple paths extending therebetween. Some multipath FORJs have optical paths that can overlap or merge with one another along a part thereof, for example in the case where two beams of different wavelengths are combined, passed from the static to the rotating part of FORJ, and finally divided into two beams of equal intensity and spectral content. In such FORJs, half of the light is lost if the two initial beams have the same wavelength or if the direction of light propagation is reversed. Truly independent dual path FORJs, that is, FORJs that can connect two rotating optical fiber ports with two non-rotating optical fiber ports regardless of their wavelength band, typically require more complex arrangements than their single path or partially shared dual path counterparts.

2. Background of the Invention

FORJs have been used in various industrial, medical and military applications including robotics, material handling systems, fiber optic cable reels, medical systems, and security systems. In particular, in recent years, FORJs have become useful devices for optogenetics applications by providing simple and inexpensive passive tools for connecting light sources to freely moving laboratory animals via optical fibers. Optogenetics is a technological field where genetic and optical methods and devices are combined to monitor and control targeted biological functions and events in specific cells (e.g. neurons, heart muscles cells) of living tissue. Optogenetics is particularly well adapted for in vivo studies of biological functions in mammals and other animals. Early optogenetics applications typically involved sending light from a laser or a light-emitting diode (LED) source along an optical fiber toward the brain of a laboratory animal, typically a mouse or a rat. In recent years, however, these simple optical links have evolved into more complex systems, which now include fiber-coupled light sources and their drivers, FORJs for in vivo experiments, light shutters or modulators, beam splitters, fiber-optic patch cords, various fiber-optic cannulas with implantable fibers, and the like.

In this regard, FORJs facilitate optogenetics experiments involving a freely moving animal by allowing the unimpaired movement of the animal, while maintaining satisfactory transfer of optical power between the two fibers and reducing the chances of damaging the fiber due to excessive torque. However, in the context of optogenetics applications where it is desirable to deliver light coming from two light sources to two distinct output points on a live animal, existing dual path FORJs suffer from several drawbacks such as partial shading of one of the light channels as in U.S. Patent Application Publication No. 20070217736 or use of glass tube walls as optical window for the passage of the collimated light beam as in U.S. Pat. No. 4,725,116 that causes aberrations and related optical losses and is not well-suited for deposition of internal and external AR coating. Both approaches are based on gradient-index lenses known as SELFOC lenses that have very limited choice of focal lengths, spectral windows and numerical apertures and are not suited for larger fiber diameters. (SELFOC is a trademark of Nippon Sheet Glass Company Limited Corporation.) In addition, those gradient index lenses require the fiber to be glued to the lens surface, which exclude the possibility of providing connectors at the rotary joint. In experiments with live animals it is common that fiber optic patch cord are being chewed, bitten or otherwise damaged by the animal and that requires change of the patchcord. If the fiber is permanently attached to the FORJ or pigtailed then the FORJ may need to be replaced, while in a version having connectors only the patch cord needs to be replaced. And finally, it is desirable that optogenetics applications include either low friction passive rotary joints driven by the animal movement or motorized rotary joints preferably including appropriate animal movement sensors.

There therefore exists a need in the art for a passive, cost-effective and compact dual optical path rotary joint capable of reliably and independently delivering two light signals from two light sources to freely moving targets or receiving independently light signal from tissue.

SUMMARY OF THE INVENTION

According to an aspect of the invention, there is provided a dual optical path rotary joint.

The dual optical path rotary joint generally includes a stationary component, a lower rotating component and an upper rotating component. The two rotating components are rotatable relative to the stationary component about a common rotation axis of the dual optical path rotary joint. The rotations of the rotating components are mechanically independent from each other, but magnetically synchronized by a magnetic coupling assembly, which may be embodied by magnets attached to each of the two rotating components.

The dual optical path rotary joint also includes two independent optical paths, which may allow for the simultaneous and rotation-insensitive passage of two light signals from a stationary side to a rotating side of the dual optical path rotary joint, or vice versa. In particular, each optical path may be configured to receive a light signal from an input optical fiber, to transmit the light signal through the rotary joint, and to output the light signal to an output optical fiber. The two optical paths may include stationary optical elements, that is, elements whose respective angular orientation remains fixed with respect to the stationary component, as well as rotating optical elements, whose respective angular orientation rotates along with the two rotating components.

In some embodiments, the stationary and rotating components of the dual optical path rotary joint include transparent interfaces that are traversed by the light signals traveling along the first and second optical paths between the stationary and rotating sides of the dual rotary joint. Advantageously, in order to avoid or mitigate the introduction of optical aberrations and enhance or maximize the optical coupling efficiency, such transparent interfaces are preferably plane-parallel surfaces, which are traversed by collimated beams of light at normal incidence.

Other features and advantages of embodiments of the present invention will be better understood upon reading of preferred embodiments thereof with reference to the appended drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATED EMBODIMENT

Figure 1:
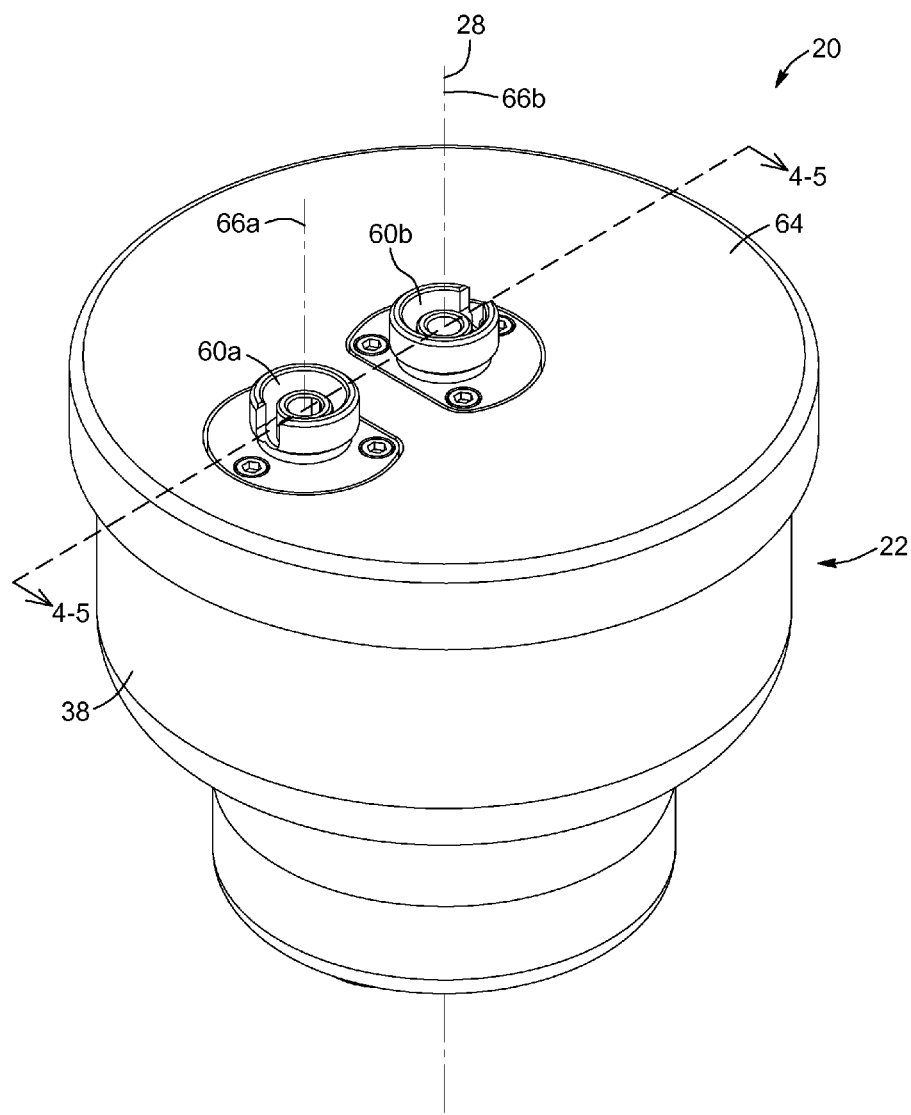
FIG. 1 is a schematic perspective top side view of a dual optical path rotary joint 20, in accordance with an embodiment of the invention.
Figure 2:
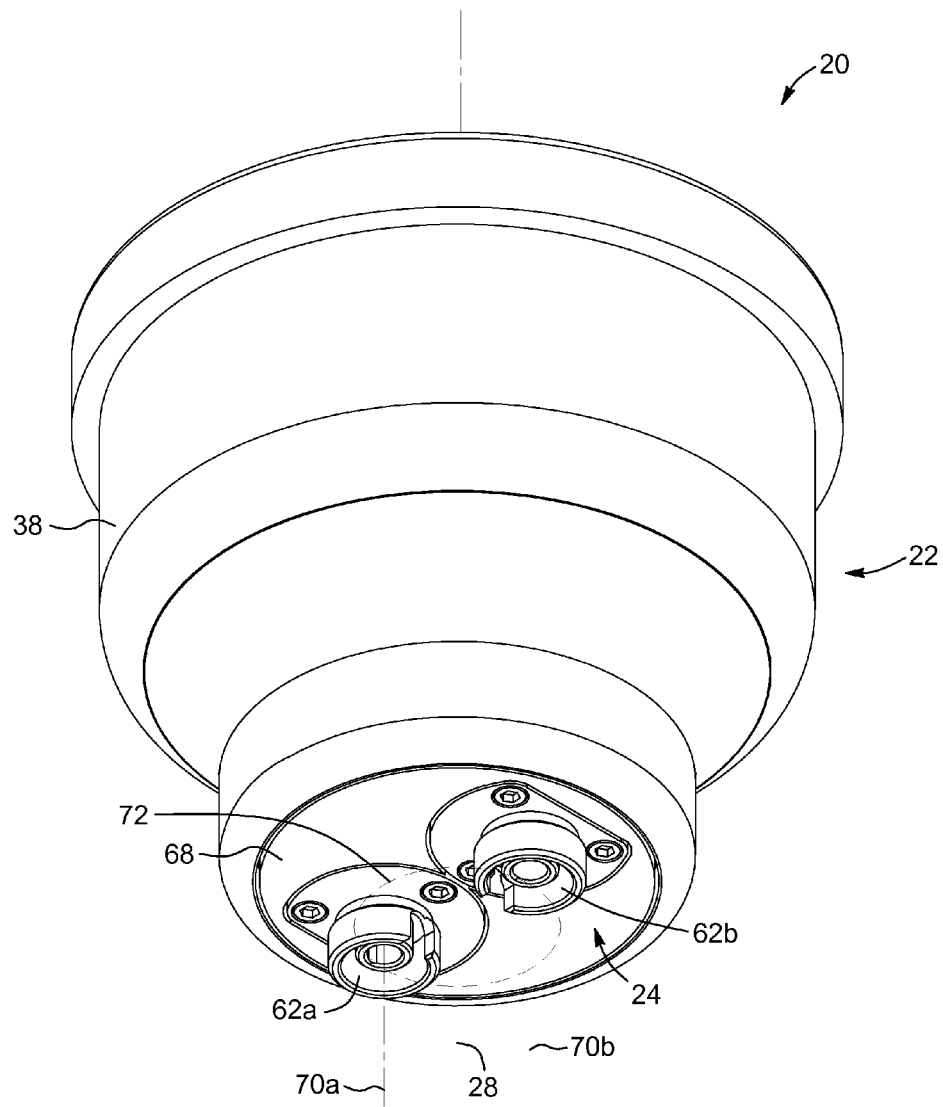
FIG. 2 is a schematic perspective bottom side view of dual optical path rotary joint 20 of FIG. 1.

In the following description, similar features in the drawings have been given similar reference numerals and in order to weigh down the figures, some elements are not referred to on some figures if they are already identified in other figures.

According to an aspect of the invention, there is provided a dual optical path rotary joint. Some embodiments of the invention permit the simultaneous, independent and rotation-insensitive delivery of two light signals from a pair of input optical ports to a pair of output optical ports in rotation relative to each other. In addition, some embodiments of the invention may provide a compact, passive and bidirectional dual optical path rotary joint, in which optical losses, dispersion and crosstalk between the two optical paths are minimized or reduced compared to existing dual optical path rotary joints by eliminating the shared optical path, the beam shading effects or curved optical interfaces (e.g. windows) present in some other 2×2 rotary joints.

Moreover, in contrast to single path or partially shared dual optical path rotary joints, embodiments of the present invention can be used to send the light coming from two different light sources to two points on the moving target independently and via separate optical fibers. In other words, embodiments of the invention can provide two completely separate optical routes along which two light signals travel without sharing optical components. Hence, depending on the intended applications, either one or both of the optical paths may be used at once. This may provide an advantage over partially shared dual optical path rotary joints used for wavelength and intensity splitting where the two light signals are either both on or off.

By way of example, in the context of optogenetics experiments, the two output optical fibers may both be attached to a freely moving laboratory animal in order to deliver two independent light signals thereto, in a manner that does not restrain and that remains essentially unaffected by the movement of the animal. For example, some embodiments of the invention can deliver light coming from two light sources to two distinct output points on a live animal, for example two distinct regions of the brain of the live animal. In addition, in embodiments permitting a bidirectional operation, the dual optical path rotary joint may advantageously be used for in vivo fluorescence measurements, wherein one optical path is used for the delivery of the excitation signal while the other optical path is used to collect the fluorescence emission signal. Each optical path could be used for fluorescent detection on its own if beam splitters are added. It will be understood that fluorescent signals may be very weak, and it may be preferable to use larger diameter collection fiber to improve signal-to-noise ratio.

However, while advantageous for in vivo optogenetics applications to facilitate delivery of light signals to, and detection of light signals from, freely moving animals via optical fibers, it is understood that any other application such as medical, industrial or other fields that may require connecting pairs of input and output optical fibers that are rotatable relative to each other could benefit from embodiments of the invention. Some examples of medical uses could be cancer detection via fluorescence measurements, optogenetically enabled light stimulation of the functioning of some brain centers, heartbeat detection, and the like. Likewise, non-limiting examples of an industrial application may be in robotic systems with fiber laser welding where one port is used for beam delivery and the other for monitoring of the welding process, missile guidance, remotely operated vehicles (ROVs) for improvised explosive device (IED) handling, wind turbines, oil drilling, sensing, and the like.

Referring to FIG. 1 through FIG. 10, there is shown a dual optical path rotary joint 20 according to an embodiment of the invention. Dual optical path rotary joint 20 generally includes a stationary component 22, a lower rotating component 24 and an upper rotating component 26. Each rotating component 24 and 26 is rotatable relative to the stationary component 22 about a common rotation axis 28 of dual optical path rotary joint 20. As will be described in further detail below, while mechanically independent from each other, the rotations of the lower and upper rotating components 24 and 26 are magnetically synchronized by a magnetic coupling assembly 30.

Dual optical path rotary joint 20 also includes two independent optical paths 32a, 32b, which will also be described in further detail below. The two optical paths 32a, 32b may be configured to receive light signals from first and second input optical fibers 34a, 34b (see FIG. 3) connected to the stationary component 22, to propagate the light signals through dual optical path rotary joint 20, and to output the light signals to first and second output optical fibers 36a, 36b connected to the lower rotating component 24 (see FIG. 3). In embodiments of the invention, the two optical paths 32a, 32b may allow for the simultaneous and rotation-insensitive passage of two light signals across dual optical path rotary joint 20, with minimal interference between the two optical paths 32a, 32b as the light signals pass through dual optical path rotary joint 20, or vice versa.

Stationary and Rotating Components of the Dual Optical Path Rotary Joint

Still referring to FIGS. 1 to 10, the stationary component 22 generally includes an external housing 38, which defines an internal cavity 40 thereinside. In the illustrated embodiment, the external housing 38 of the stationary component 22 is generally cylindrical in shape, but may assume any other suitable shape. Furthermore, the external housing 38 may be made of any appropriate material known in the art, preferably a lightweight yet strong material capable of sustaining frequent use, for example plastics, stainless steel, aluminum or ceramic.

The stationary component 22 also includes a transparent plate 42, which extends inside and divides the internal cavity 40 into a lower and an upper portion 44 and 46 thereof, as shown in FIGS. 4, 5, 7 and 8. The transparent plate 42 may be made of glass or of any other appropriate transparent material. As used herein the term "transparent" is intended to mean that the plate 42 has a high transmittance to light within the operating wavelength range of dual optical path rotary joint 20, similar to transmission of other optical components along the light path. In the illustrated embodiment, the transparent plate 42 is shaped as a circular thin disk extending in a plane substantially perpendicular to the rotation axis 28 and whose outer edge is secured to the peripheral wall of the internal cavity 40 by an appropriate securing means. The transparent plate 42 is preferably sufficiently thick to hold stationary optical elements of the two optical paths 32a, 32b solidly in place, and preferably with anti-reflection coating on the portions of transparent place 42 that serve as a light window between the stationary and rotating sides of dual optical path rotary joint 20. It will be understood that the term "stationary optical element" refers to an optical element of dual optical path rotary joint 20 having an angular orientation that remains fixed with respect to the stationary component 22 as the lower and upper rotating components 24 and 26 rotate relative thereto about the rotation axis 28.

The lower and upper rotating components 24 and 26 are received inside the lower portion 44 and the upper portion 46 of the internal cavity 40 of the stationary component 22, respectively. Each rotating component 24 and 26 is rotatably and concentrically mounted in the stationary component 22 for rotation relative thereto about the rotation axis 28. In the illustrated embodiment, both rotating components 24 and 26 are coupled to the stationary component 22 by bearing assemblies 48 and 50 that can maintain precise angular and lateral alignment during rotation thereof. Advantageously, the bearing assemblies 48 and 50 may permit continuous and unrestricted rotation of the lower and upper rotating components 24 and 26 about the rotation axis 28 in both clockwise and counterclockwise directions.

However, it will be understood that the bearing number and disposition shown in FIGS. 4, 5, 7 and 8 are for exemplary purposes and that other configurations could be used in other embodiments. In particular, the bearing assemblies 48 and 50 may be precision ball bearings, but other bearing or coupling mechanisms could be employed without departing from the scope of the invention, for example coupling mechanisms specifically intended for use in environments that are corrosive or that require sterilization of equipment.

Magnetic Coupling Assembly

As mentioned above, the rotations of the lower and upper rotating components 24 and 26 are mechanically independent but magnetically synchronized by the magnetic coupling assembly 30. Hence, when the lower rotating component 24 rotates within the stationary component 22, for example in response to a torque exerted on the output optical fibers 36a, 36b connected thereto, the upper rotating component 26, while free to rotate on its bearing assembly 50, will be driven to rotate along the lower rotating component 24 via the magnetic interaction established therebetween by the magnetic coupling assembly 30. The magnetic coupling assembly 30 may include a set of lower magnets 52 secured to a top portion 54 of the lower rotating component 24 and a set of upper magnets 56 secured to a bottom portion 58 of the upper rotating component 26. In the illustrated embodiment, the top portion 54 and bottom portion 58 are vertically separated from each other by the transparent plate 42 of the stationary component 22, as better shown in FIGS. 4 to 8 and FIG. 10.

In the illustrated embodiment, the set of lower and upper magnets 52 includes a pair of diametrically opposed magnets. Specifically, the set of lower magnets 52 includes two diametrically opposed magnets 52, i.e., separated by 180 degrees of rotation, disposed along the peripheral region of the top portion 54 of the lower rotating component 24. Moreover, the magnetic moments of the two lower magnets 52 both point vertically but in opposite direction. As understood herein, the direction of the magnetic moment of a magnet is understood to point from the south pole of the magnet to the north pole thereof, which are respectively identified by the letters "S" and "N" in FIGS. 7 and 8. Likewise, the set of upper magnets 56 includes two diametrically opposed magnets 56 secured to the bottom portion 58 of the upper rotating component 26. The magnetic moments of the two upper magnets 56 also point vertically but in opposite direction. In the exemplary configuration shown in FIGS. 7 and 8, as a result of the magnetic coupling between the lower and upper pairs of magnets 52 and 56, the upper magnet 56 having its north pole oriented downward will be aligned with the lower magnet 52 having its south pole oriented upward, while the upper magnet 56 having its south pole oriented downward will be aligned with the lower magnet 52 having its north pole oriented upward.

It will be understood that the magnetic coupling assembly 30 shown in the embodiment of FIGS. 4 to 10 is exemplary only and that in other embodiments, the magnets need not be cylindrical magnets nor do they need to be all identical. In particular, it will be understood that the number, shape, strength, polarity and configuration of the lower and upper magnets 52 and 56 secured to the lower and upper rotating components may differ in other embodiments, as long as the magnetic interaction established between the set of lower and upper magnets 52 and 56 of the magnetic coupling assembly 30 causes the lower and upper rotating components 24 and 26 to rotate in unison about the rotation axis 28 of dual optical path rotary joint 20.

Optical Paths

Referring back to FIGS. 1 to 10, the first and second optical paths 32a, 32b extends between respective input optical ports 60a, 60b provided on the stationary component 22 and output optical ports 62a, 62b provided on the lower rotating component 24. It is to be noted that because embodiments of dual optical path rotary joint 20 may be bidirectional with respect to light propagation, the use of the terms "input" and "output" in specifying the direction of light propagation may be reversed in other embodiments.

Figure 3:
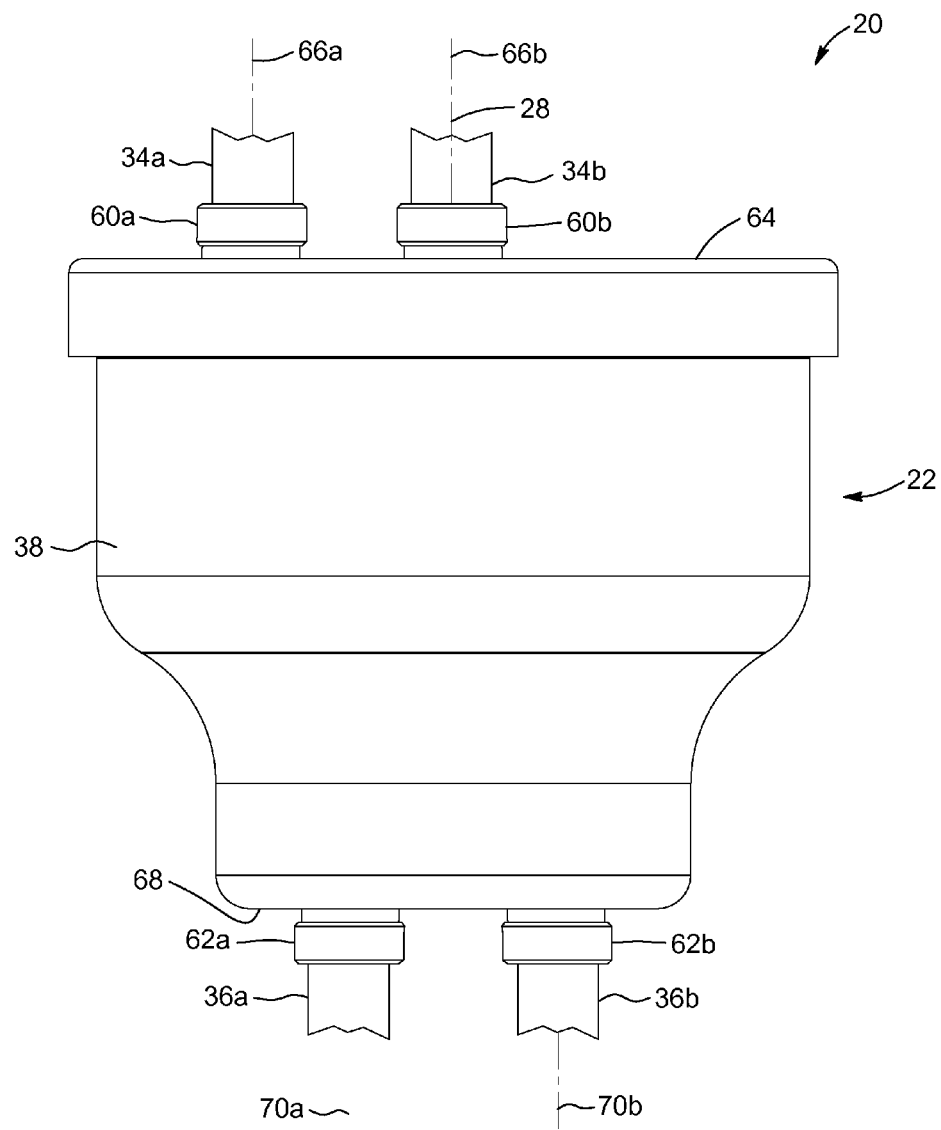
FIG. 3 is a schematic side elevation view of dual optical path rotary joint 20 of FIG. 1.

As shown in FIG. 3, the first and second input optical ports 60a, 60b are connectable to the first and second input optical fibers 34a, 34b, while the first and second output optical ports 62a, 62b are connectable to the first and second output optical fibers 36a, 36b. It will be understood that dual optical path rotary joint 20 is not limited by the type of optical fibers connectable thereto, which may include, without being limited to, single mode fibers, polarization maintaining fibers and multimode fibers. It will further be understood that in some embodiments, the input optical ports 60a, 60b of dual optical path rotary joint 20 need not be connected to an optical fiber, but may be configured to receive collimated light signals originating from laser diodes or from single or multiple LEDs. Likewise, the light signals outputted at the output optical ports 62a, 62b of dual optical path rotary joint 20 may be kept collimated or be focused to different geometries of fiber bundles.

In the illustrated embodiment, the two input optical ports 60a, 60b protrude vertically upwardly from a top portion 64 of the stationary component 22 and define input optical axes 66a, 66b extending in a parallel relation to the rotation axis 28. In the illustrated embodiment, the first input optical axis 66a is offset from the rotation axis 28 while the second input optical axis 66b is aligned with the rotation axis 28, but other configurations may be envisioned in other embodiments.

Still referring to FIG. 3, the two output optical ports 62a, 62b protrude vertically downwardly from a bottom portion 68 of the lower rotating component 24 and define output optical axes 70a, 70b, each extending in parallel but radially offset relation to the rotation axis 28. In the illustrated embodiment, the output optical axes 70a, 70b are equally spaced from the rotation axis 28, such that the output optical fibers 36a, 36b connected to the output optical ports 62a, 62b follow a common circular path 72 (see, e.g. FIG. 2) in a plane transverse to the rotation axis 28 as the lower rotating component 24 rotates relative to the stationary component 22. However, other configurations of the output optical ports 62a, 62b on the bottom portion 68 of the lower rotating component 24 are also within the scope of the present invention. Advantageously, in some embodiments, the output optical ports 62a, 62b are disposed close to the rotation axis 28, thereby reducing the radius of the circular path 72 followed by the output optical fibers 36a, 36b and the torque exerted thereon.

In the context of optogenetics experiments, the two output optical fibers 36a, 36b, which are connected at one end to the two output optical ports 62a, 62b, may be connected, at their other end, to a freely moving laboratory animal to deliver thereto or collecting therefrom light signals. It will thus be understood that as the animal moves, it may cause the lower rotating component 24 to rotate about the rotation axis 28, which will drive, via the magnetic coupling assembly 30, a synchronous rotation of the upper rotating component 26.

Referring to FIGS. 4, 5, 7 and 8, the principles of operation of dual optical path rotary joint 20 will now be considered. More specifically, the propagation of light inside dual optical path rotary joint 20 as the upper and lower rotating components 24 and 26 rotate with respect to the stationary component 22 will be described successively for each of the first and second optical paths 32a, 32b.

Figure 4:
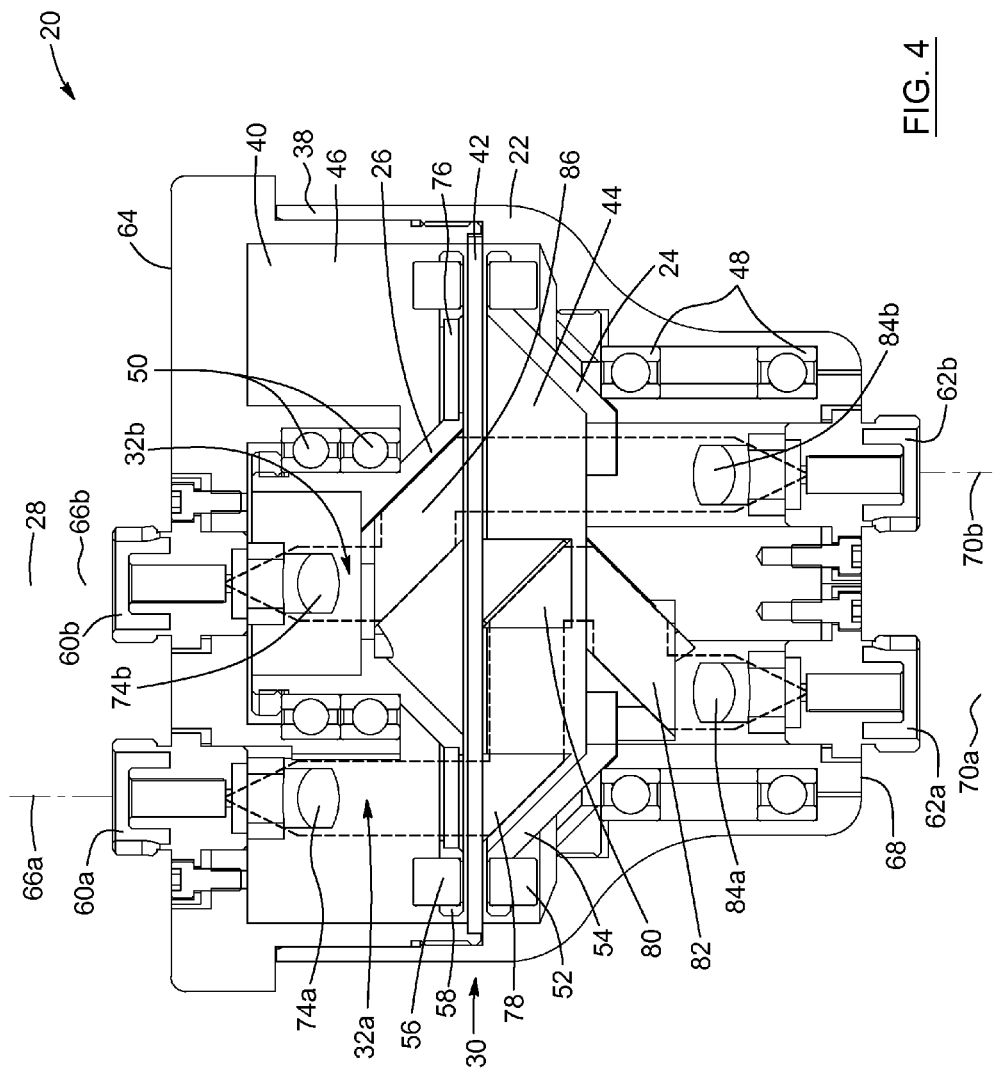
FIG. 4 is a schematic cross-sectional side elevation view of FIG. 3, taken along section line 4.
Figure 5:
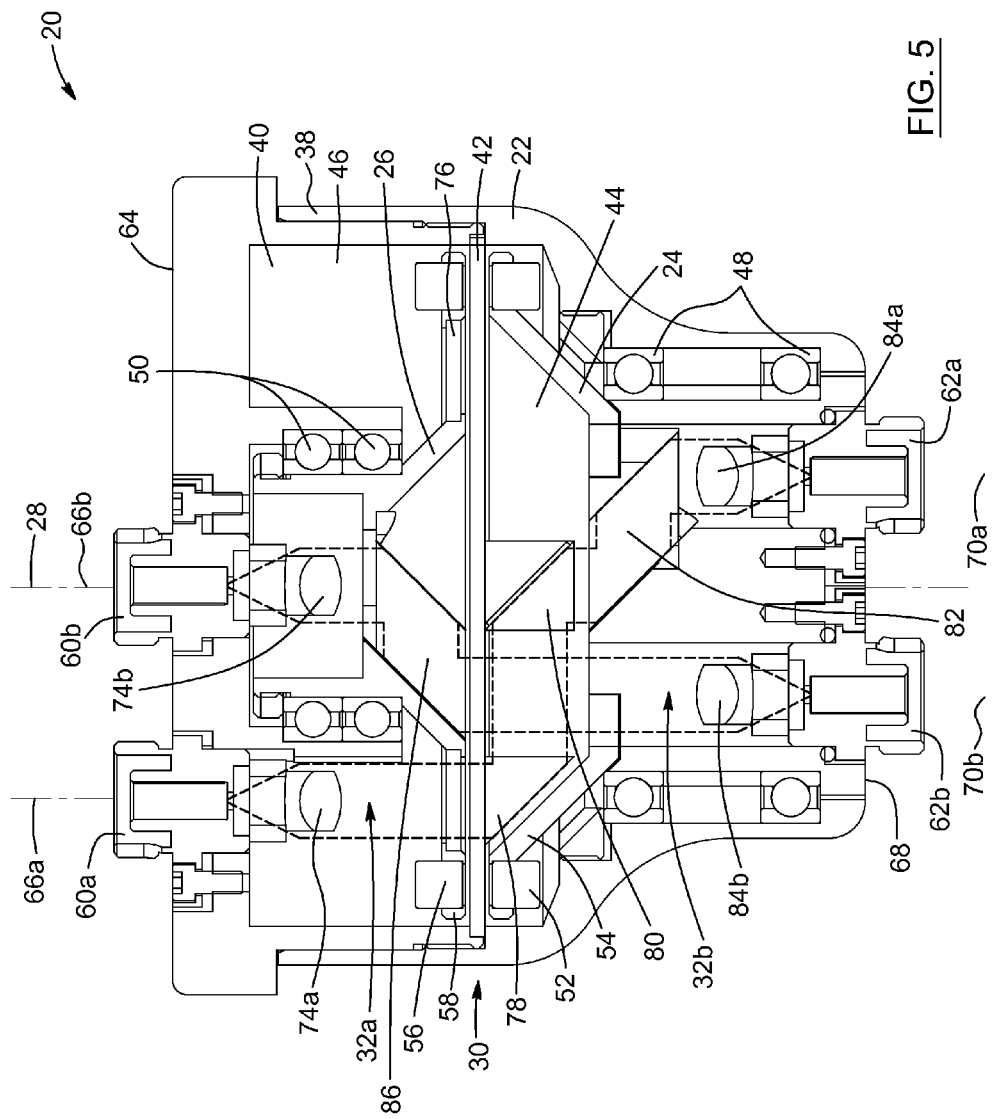
FIG. 5 shows the schematic cross-sectional side elevation view of FIG. 4, with the first and second rotating components of dual optical path rotary joint 20 rotated 180 degrees.
Figure 6:
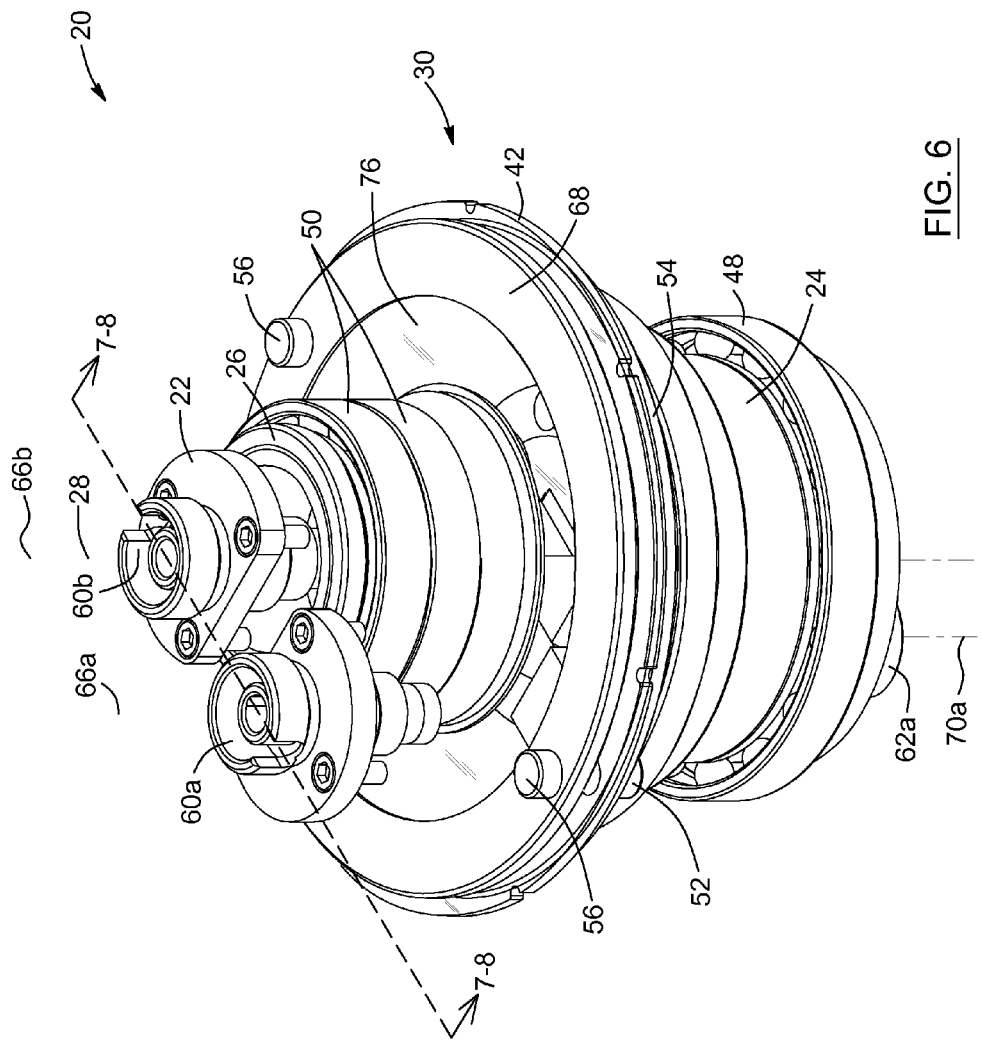
FIG. 6 is the schematic perspective top side view of FIG. 1 with the housing of the stationary component of dual optical path rotary joint 20 removed.
Figure 7:
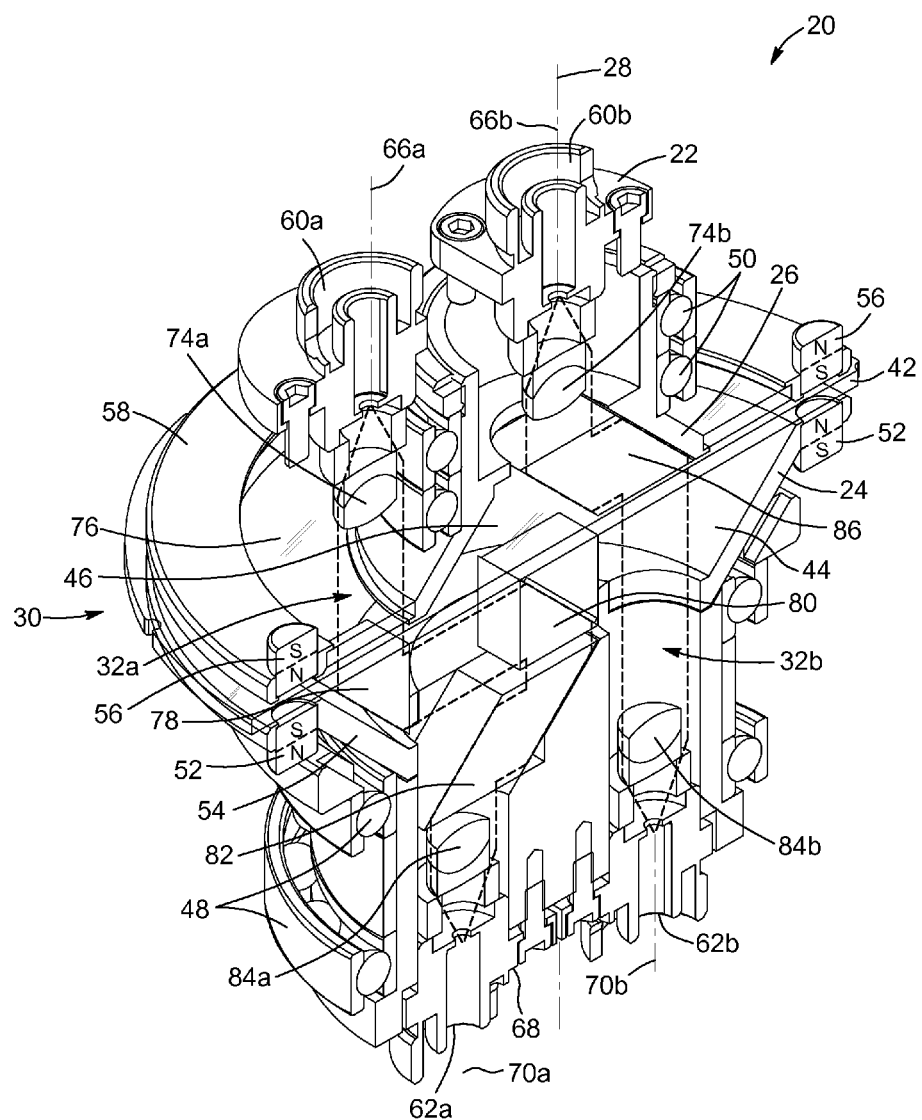
FIG. 7 is a schematic cross-sectional perspective side view of FIG. 6, taken along section line 7.
Figure 8:
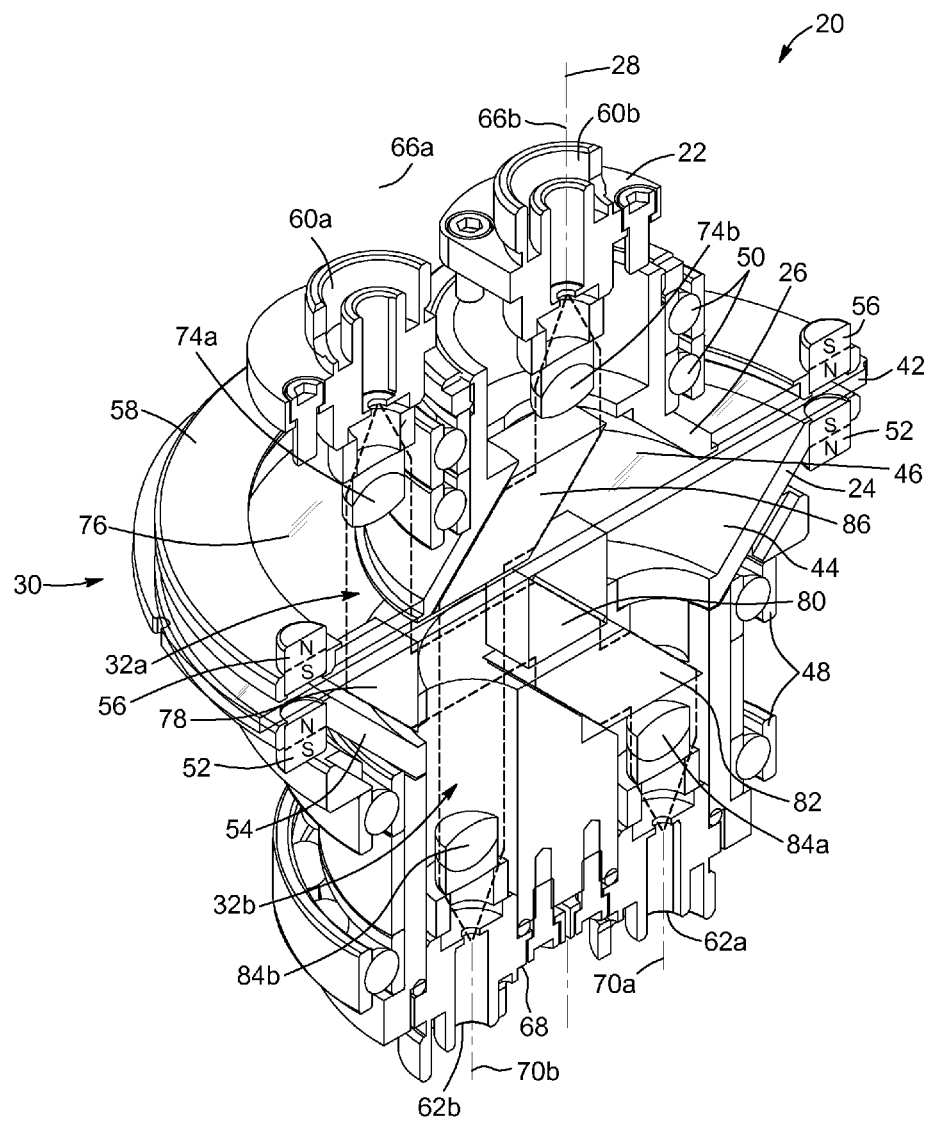
FIG. 8 is the schematic cross-sectional perspective side view of FIG. 7, with the rotating component of dual optical path rotary joint 20 rotated 180 degrees.
Figure 9:
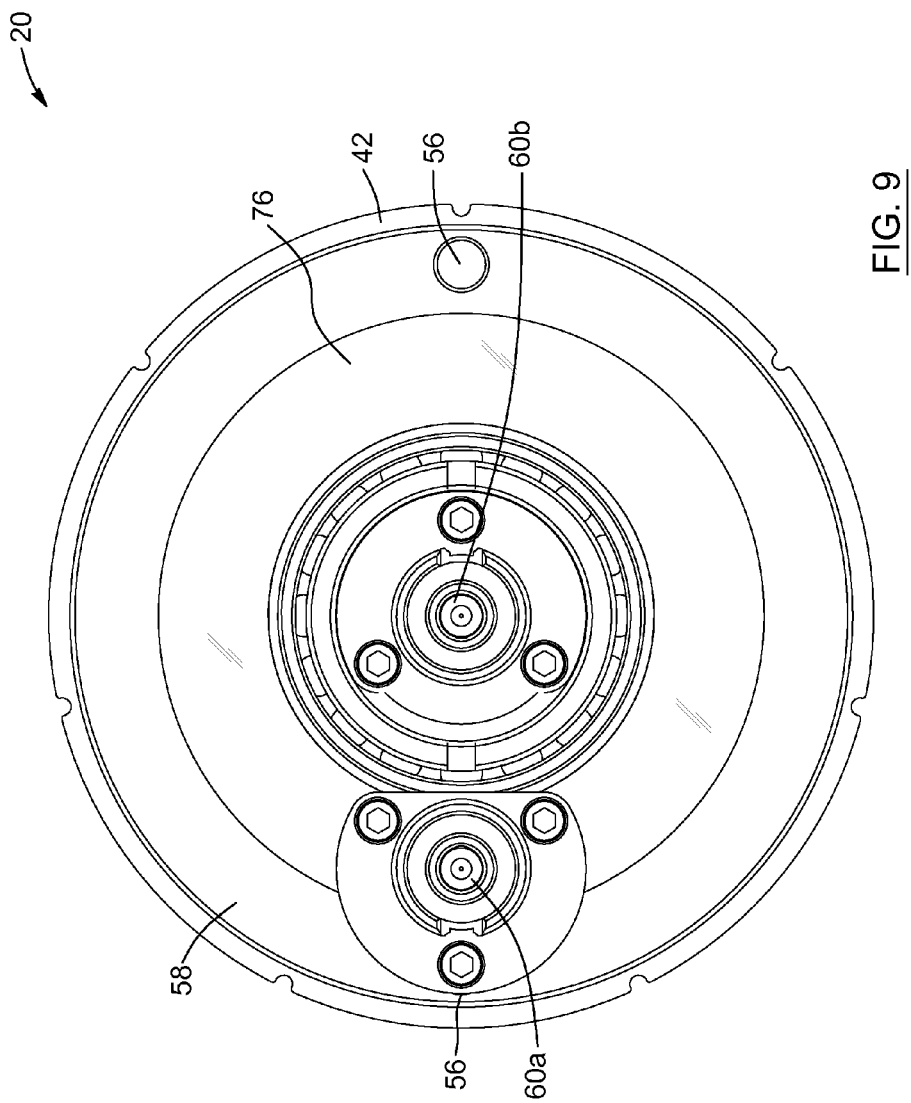
FIG. 9 is a top plan view and FIG. 10 is a side elevation view of the dual optical path rotary joint of FIG. 6.
Figure 10:
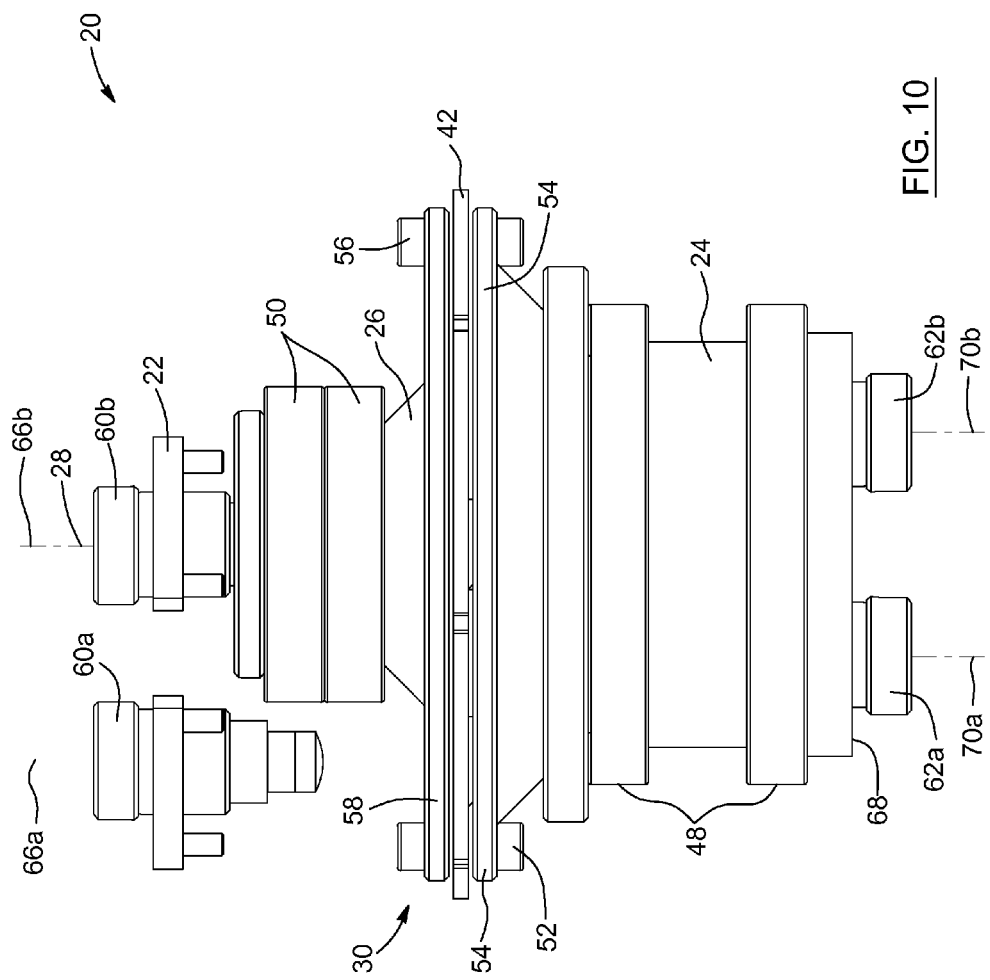

It is to be noted that FIGS. 5 and 8 are the same views as FIGS. 4 and 7, respectively, except that in FIGS. 5 and 8, the first and second rotating components have rotated 180 degrees with respect to FIGS. 4 and 7. Throughout of the present description the configuration of FIGS. 4 and 7 will be referred to as the zero-degree configuration while the configuration of FIGS. 5 and 8 will be referred to as the 180-degree configuration. Of course, it will be understood that these designations are arbitrary and for the convenience of the description only. It will also be understood that each of the first and second optical paths 32a, 32b includes stationary optical elements, which are secured to the stationary component 22, and rotating optical elements that are connected to one of the lower and upper rotating components 24 and 26.

First Optical Path

The first optical path 32a receives a first light signal from the first input optical fiber 34a via the first input optical port 60a. Upon entering the first optical path 32a, the first light signal is received and collimated by a first collimating lens 74a. The collimating lens preferably has a numerical aperture (NA) that exceed that of the optical fiber and a sufficiently long focal length so that beam divergence does not cause coupling loss. The collimated first light signal travels along the first input optical axis 60a, and is successively incident at normal incidence onto and transmitted through a transparent segment 76 of the upper rotating component 26 and the transparent plate 42 introduced above and secured to the stationary component 22.

In the illustrated embodiment, the transparent segment 76 is shaped as an annular thin disk extending in a plane substantially perpendicular to the first input optical axis 60a. The thickness of the transparent disk should be sufficient to hold the set of upper magnets 56 of the magnetic coupling assembly 30. The transparent segment 76 may be made of any appropriate material transparent to the wavelength light such as, for example, glass. The radius and width of the transparent segment 76 are preferably selected so as to allow the entire beam width of the collimated first light signal to be transmitted therethrough.

It will be understood by one of ordinary skill in the art that the transparent plate 42 and the transparent segment 76 of the upper rotating component 26 are provided primarily to serve a mechanical function. Specifically, the transparent plate 42 provides attachment points for stationary optical elements of the two optical paths 32a, 32b. Likewise, the transparent segment 76 allows connecting the central region of the upper rotating component 26, which is connected by bearings to the stationary component 22, and the peripheral region of the upper rotating component 26, on which are disposed the set of upper magnets 56 of the magnetic coupling assembly 30.

The transparent plate 42 and the transparent segment 76 preferably serve their mechanical function while causing minimal impact on the propagation of the light signals through dual optical path rotary joint 20. To this end, the transparent plate 42 and segment 76 are arranged so as to be traversed by collimated beams of light at normal incidence, as shown in FIGS. 4 and 5.

Unlike curved plates such as cylinders, which introduce optical aberrations to the collimated beam, the plane-parallel plate 42 according to embodiments of the invention generally does not introduce any aberrations to a perpendicular collimated beam. The transparent plate 42 and the transparent segment 76 may also be coated with an anti-reflective dielectric coating to reduce residual reflections and the optical losses associated therewith. In this regard, it will be understood by one of ordinary skill in the art that the deposition of anti-reflective coating on flat surfaces generally poses much less technological challenge than coating the glass tube, especially on interior surfaces.

After passing through the transparent segment 76 and the transparent plate 42 along the first input optical axis 60a, the collimated first light signal travels is reflected by 90 degrees inwardly by a first stationary reflector 78 secured to the transparent plate 42, and is reflected again by 90 degrees by a second stationary reflector 80 also secured to the transparent plate 42. After being reflected by the second stationary reflector 80, the collimated first light signal travels along the rotation axis 28 toward a first rotating reflector 82 secured to and rotating with the lower rotating component 24. It will be understood that the space between the second stationary reflector 80 and the first rotating reflector 82 delimits the stationary and rotating sides of the first optical path 32a of dual optical path rotary joint 20, as is apparent by comparing the zero-degree configuration of FIGS. 4 and 7 with the 180-degree configuration of FIGS. 5 and 8.

The collimated first light signal then enters the first rotating reflector 82, where it is successively reflected by 90 degrees outwardly and reflected by 90 degrees downwardly, and thus exits the first rotating reflector 82 as a collimated light beam traveling along the first output optical axis 60a. The rotation of the first rotating reflector 82 between the zero-degree and the 180-degree configurations is illustrated in FIGS. 4, 5, 7 and 8.

The first optical path 32a finally includes a first focusing lens 84a that focuses the collimated first light signal coming from the first rotating reflector 82 before it exits dual optical path rotary joint 20 via the first output optical port 62a. Unless, for example, there is a change in system magnification imposed by the size of the attached optical fibers, the lenses 74a and 84a can have same or similar optical parameters like NA or focal length.

In the illustrated embodiment, the first and second stationary reflectors 78 and 80 secured to the stationary component 22 are embodied by a triangular-shaped prism having one reflecting surface, while the first rotating reflector 82 is embodied by a parallelogram-shaped prism having two parallel reflecting surfaces. It will be understood that these prisms reflects light by total internal reflection at their reflecting surfaces. It will also be understood that other appropriate reflecting optical components may alternatively or additionally be used such as simple mirrors, rectangular prisms or pentagonal prisms.

Second Optical Path

The second optical path 32b receives a second light signal from the second input optical fiber 34b via the second input optical port 60b. Upon entering the second optical path 32b, the second light signal is received and collimated by a second collimating lens 74b.

The collimated second light signal travels along the second input optical axis 60b toward a second rotating reflector 86 secured to and rotating with the upper rotating component 26. In the illustrated embodiment, the second rotating reflector 86 is embodied by a rhombic prism but could be embodied by any appropriate reflecting optical component such as, for example, by a set of two mirrors.

It will be understood that the space between the second collimating lens 74b and the second rotating reflector 86 delimits the stationary and rotating sides of the second optical path 32b of dual optical path rotary joint 20, as is apparent by comparing FIGS. 4 and 7 with FIGS. 5 and 8, respectively. The rotation of the second rotating reflector 86 between the zero-degree and the 180-degree configurations is illustrated in FIGS. 4, 5, 7 and 8.

The collimated second light signal then enters the second rotating reflector 86, where it is successively reflected by 90 degrees outwardly and reflected by 90 degrees downwardly. In other words, the collimated second light signal is laterally shifted by the second rotating reflector 86. Upon exiting the second rotating reflector 86, the collimated second light signal is incident at normal incidence onto and transmitted through the transparent plate 42 as a collimated beam of light traveling along the second output optical axis 70b. As mentioned above regarding the propagation of light along the first optical path 32a, ensuring that the transparent plate 42 defines a flat optical interface and that the second light signal is incident thereonto as a normally-incident collimated beam of light can advantageously reduce the detrimental effect of optical aberrations compared to configurations involving light striking curved optical interfaces at oblique incidence.

Referring to FIGS. 5 and 8, it can be seen that in the 180-degree configuration, the first and second light signals cross each other at 90 degrees as the first light signal exits the first stationary reflector 78 and the second light signal exits the second rotating reflector 86. However, it will be understood that as long as the intensities of the first and second light beams remain sufficiently low for the approximation of linear optics to hold, the first and second light signals will not be degraded, modified or otherwise affected as they cross each other.

The second optical path 32b finally includes a second focusing lens 84b that focuses the collimated light signal coming from the second rotating reflector 86 before the light signal exits dual optical path rotary joint 20 via the second output optical port 62b.

While the invention has been particularly shown and described with reference to the preferred embodiment thereof, it will be understood by those skilled in the art that the foregoing and other changes in form, and details may be made therein without departing from the spirit and scope of the invention.

What is claimed:

1. A dual optical path rotary joint, comprising:
    a stationary component having a first optical port and a second optical port;
    a first rotating component rotatably coupled to the stationary component, such that the first rotating component is rotatable with respect to the stationary component about a rotational axis; and
    a second rotating component having a third optical port and a fourth optical port and rotatably coupled to the stationary component, such that the second rotating component is rotatable with respect to the stationary component about the rotational axis, wherein the first rotating component and the second rotating component are magnetically linked to synchronize a common angle of rotation of the first rotating component and the second rotating component, but are not otherwise mechanically coupled in rotation, and wherein the first optical port is coupled to the third optical port by a first optical path extending between the stationary component and the second rotating component, and wherein the second optical port is coupled to the fourth optical port by a second optical path extending between the stationary component and the second rotating component.

2. The dual optical path rotary joint of claim 1, wherein the first optical path extends through a center of the first rotating component along the rotational axis, whereby first light is directed along the first optical path through the first rotating component without sensitivity to the rotation of the first rotating component with respect to the stationary component.

3. The dual optical path rotary joint of claim 2, wherein the first rotating component comprises:
    a first reflector for directing the first light to or from the first optical port through a center of the first rotating component along the rotational axis without sensitivity to the rotation of the first rotating component with respect to the stationary component; and
    a second reflector for directing the first light to or from the first reflector, wherein the second reflector is offset from the center of the rotational axis, whereby the second reflector directs the first light into or out of the second rotating component.

4. The dual optical path rotary joint of claim 3, wherein the second optical path extends through a transparent annular segment of the first rotating component.

5. The dual optical path rotary joint of claim 4, wherein the stationary component comprises:
   a transparent plate;
   a third reflector mounted to the transparent plate and disposed at the center of the rotational axis for directing second light to or from the second optical port through the transparent annular segment of the first rotating component, whereby the third reflector directs the second light into or out of the second rotating component without sensitivity to the rotation of the second rotating component with respect to the stationary component; and
   a fourth reflector mounted to the transparent plate for directing the second light to or from the third reflector.

6. The dual optical path rotary joint of claim 5, wherein the first optical port, the second optical port, the third optical port and the fourth optical port are fiber optic connectors, and wherein the dual optical path rotary joint further comprises:
   a first collimating lens disposed between the first optical port and the first reflector;
   a second collimating lens disposed between the second optical port and the third reflector;
   a third collimating lens disposed between the third optical port and the second reflector; and
   a fourth collimating lens disposed between the fourth optical port and a fifth reflector of the second rotating component, wherein the second rotating component further comprises a sixth reflector disposed at the center of the rotational axis for directing the second light to or from the fourth reflector, wherein the fifth reflector directs the second light to or from the sixth reflector.

7. The dual optical path rotary joint of claim 1, wherein the stationary component includes a housing for mounting the dual optical path rotary joint, wherein the first rotating component is enclosed within the housing, and wherein at least a portion of the second rotating component is enclosed within the housing, and wherein dual optical path rotary joint further comprises:
   a first bearing disposed between the housing and first rotating component; and
   a second bearing disposed between the housing and the second rotating component.

8. The dual optical path rotary joint of claim 1, further comprising:
   at least two first magnets affixed to the first rotating component near a circumference of the first rotating component and at a first end thereof proximate the second rotating component; and
   at least two second magnets affixed to the second rotating component near a circumference of the second rotating component and at a first end thereof proximate corresponding ones of the first magnets, wherein the third optical port and the fourth optical port are disposed at a second end of the second rotating component.

9. The dual optical path rotary joint of claim 7, wherein magnetic moments of the at least two of the first magnets alternate in polarity around the circumference of the first rotating component and at least two of the second magnets alternate in polarity around the circumference of the second rotating component.

10. A method for delivering first light and second light through a rotary joint, comprising:
   first directing the first light between a first optical port of a stationary component of the rotary joint and a third optical port of a second rotating component of the rotary joint; and
   second directing the second light between a second optical port of a stationary component of the rotary joint and a fourth optical port of a second rotating component of the rotary joint, wherein the second directing further directs the second light via a first rotating component rotatably coupled to the stationary component, such that the first rotating component is rotatable with respect to the stationary component about a rotational axis, wherein the second rotating component is rotatably coupled to the stationary component about the rotational axis; and
   magnetically linking the first rotating component and the second rotating component to synchronize a common angle of rotation the first rotating component and the second rotating component, wherein the first rotating component and the second rotating component are not otherwise mechanically coupled in rotation, and wherein the first optical port is coupled to the third optical port by a first optical path extending between the stationary component and the second rotating component, and wherein the second optical port is coupled to the fourth optical port by a second optical path extending between the stationary component and the second rotating component.

11. The method of claim 10, wherein the first optical path extends through a center of the first rotating component along the rotational axis, whereby the first directing directs the first light along the first optical path through the first rotating component without sensitivity to the rotation of the first rotating component with respect to the stationary component.

12. The method of claim 11, wherein the first directing directs the first light to or from the first optical port through a center of the first rotating component along the rotational axis with a first reflector, whereby the first light is directed without sensitivity to the rotation of the first rotating component with respect to the stationary component, and wherein the first directing further directs the first light to or from the first reflector using a second reflector is offset from the center of the rotational axis, whereby the second reflector directs the first light into or out of the second rotating component.

13. The method of claim 12, wherein the second directing directs the second light through a transparent annular segment of the first rotating component.

14. The method of claim 13, wherein the stationary component comprises a transparent plate, and wherein the second directing directs the second light to or from the second optical port through the transparent annular segment of the first rotating component and to or from a third reflector mounted to the transparent plate at a center of the rotational axis, whereby the second directing directs the second light into or out of the second rotating component without sensitivity to the rotation of the second rotating component with respect to the stationary component, and wherein the second directing further directs the second light to or from the third reflector with a fourth reflector mounted to the transparent plate.

15. The method of claim 14, wherein the first optical port, the second optical port, the third optical port and the fourth optical port are fiber optic connectors, and wherein the method further comprises:
   providing a first collimating lens disposed between the first optical port and the first reflector;
   providing a second collimating lens disposed between the second optical port and the third reflector;

providing a third collimating lens disposed between the third optical port and the second reflector; and providing a fourth collimating lens disposed between the fourth optical port and a fifth reflector of the second rotating component, and wherein the second directing further uses a sixth reflector disposed at the center of the rotational axis to direct the second light to or from the fourth reflector and uses the fifth reflector to directs the second light to or from the sixth reflector.

16. The method of claim 10, wherein the stationary component includes a housing for mounting the dual optical path rotary joint, and wherein the method further comprises:

enclosing the first rotating component is enclosed within the housing;

enclosing at least a portion of the second rotating component within the housing;

providing a first bearing disposed between the housing and first rotating component; and providing a second bearing disposed between the housing and the second rotating component.

17. The method of claim 10, further comprising:

affixing at least two first magnets to the first rotating component near a circumference of the first rotating component and at a first end thereof proximate the second rotating component; and affixing at least two second magnets to the second rotating component near a circumference of the second rotating component and at a first end thereof proximate corresponding ones of the first magnets, wherein the third optical port and the fourth optical port are disposed at a second end of the second rotating component.

18. The method of claim 17, wherein magnetic moments of the at least two of the first magnets alternate in polarity around the circumference of the first rotating component and at least two of the second magnets alternate in polarity around the circumference of the second rotating component.

19. A dual optical path rotary joint, comprising:

a stationary component having a first optical port and a second optical port;

a first rotating component rotatably coupled to the stationary component, such that the first rotating component is rotatable with respect to the stationary component about a rotational axis, wherein the first rotating component comprises a first reflector for directing first light to or from the first optical port through a center of the first rotating component along the rotational axis without sensitivity to the rotation of the first rotating component with respect to the stationary component and a second reflector for directing the first light to or from the first reflector, wherein the second reflector is offset from the center of the rotational axis; and a second rotating component having a third optical port and a fourth optical port and rotatably coupled to the stationary component, such that the second rotating component is rotatable with respect to the stationary component about the rotational axis, wherein the first rotating component and the second rotating component are magnetically linked to synchronize a common angle of rotation the first rotating component and the second rotating component, but are not otherwise mechanically coupled in rotation, and wherein the first optical port is coupled to the third optical port by a first optical path extending between the stationary component and the second rotating component through a center of the first rotating component along the rotational axis, and wherein the second optical port is coupled to the fourth optical port by a second optical path extending between the stationary component and the second rotating component through a transparent annular segment of the first rotating component, wherein the stationary component comprises a transparent plate, a third reflector mounted to the transparent plate and disposed at the center of the rotational axis for directing second light to or from the second optical port through the transparent annular segment of the first rotating component, and a fourth reflector mounted to the transparent plate for directing the second light to or from the third reflector.

20. The method of claim 19, further comprising:

affixing at least two first magnets to the first rotating component near a circumference of the first rotating component and at a first end thereof proximate the second rotating component; and affixing at least two second magnets to the second rotating component near a circumference of the second rotating component and at a first end thereof proximate corresponding ones of the first magnets, wherein the third optical port and the fourth optical port are disposed at a second end of the second rotating component, wherein magnetic moments of the at least two of the first magnets alternate in polarity around the circumference of the first rotating component and at least two of the second magnets alternate in polarity around the circumference of the second rotating component.

\* \* \* \* \*